US012606473B2

(12) United States Patent　　　　(10) Patent No.:　US 12,606,473 B2
Boltz et al.　　　　　　　　　　　　(45) Date of Patent:　　Apr. 21, 2026

(54) WASTEWATER TREATMENT SYSTEMS AND METHODS

(71) Applicants: ARIZONA BOARD OF REGENTS ON BEHALF OF ARIZONA STATE UNIVERSITY, Scottsdale, AZ (US); REGENTS OF THE UNIVERSITY OF MICHIGAN, Ann Arbor, MI (US)

(72) Inventors: Joshua Boltz, Tempe, AZ (US); Bruce Rittmann, Tempe, AZ (US); Glen Daigger, Ann Arbor, MI (US)

(73) Assignees: ARIZONA BOARD OF REGENTS ON BEHALF OF ARIZONA STATE UNIVERSITY, Scottsdale, AZ (US); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 390 days.

(21) Appl. No.: 18/255,857

(22) PCT Filed: Dec. 3, 2021

(86) PCT No.: PCT/US2021/061893

§ 371 (c)(1),
(2) Date: Jun. 2, 2023

(87) PCT Pub. No.: WO2022/120232

PCT Pub. Date: Jun. 9, 2022

(65) Prior Publication Data

US 2024/0025781 A1　　Jan. 25, 2024

Related U.S. Application Data

(60) Provisional application No. 63/121,363, filed on Dec. 4, 2020.

(51) Int. Cl.
C02F 3/28　　　　(2023.01)
C02F 3/08　　　　(2023.01)
(Continued)

(52) U.S. Cl.
CPC .............. C02F 3/2853 (2013.01); C02F 3/08 (2013.01); C02F 3/102 (2013.01); C02F 3/1268 (2013.01)

(58) Field of Classification Search
None
See application file for complete search history.

(56) References Cited

U.S. PATENT DOCUMENTS 5,494,577 A　　2/1996　Rekers
7,387,723 B2　　6/2008　Jordan
(Continued)

FOREIGN PATENT DOCUMENTS

CN　　　205803101 U　*　12/2016
WO　WO-2014017466 A1　*　1/2014　............... C02F 3/28
WO　　　2022120232　　6/2022

OTHER PUBLICATIONS

Christian, S., Grant, S., Mccarthy, P., Wilson, D., Mills, D. (2010). "The first two years of full-scale anaerobic membrane bioreactor (AnMBR) operation treating high-strength wastewater." Water Practice and Technology. 6(2). 1-7.

(Continued)

*Primary Examiner* — Krishnan S Menon
(74) *Attorney, Agent, or Firm* — Fuller IP Law LLC; Rodney J. Fuller

(57)　　　　　　ABSTRACT

A biofilm membrane bioreactor system with a bioreactor, at least two membrane plates positioned within the bioreactor, and a plurality of biofilm carriers suspended within the wastewater in the bioreactor. The bioreactor has at least one inlet and at least one outlet. The at least two membrane plates are configured to filter the wastewater to generate permeate and may be formed of a ceramic material. Each of the at least two membrane plates are separated from adjacent membrane plates by a membrane gap that is at least two (Continued)

times larger than a smallest dimension of one of the biofilm carriers.

15 Claims, 7 Drawing Sheets

(51) Int. Cl.
C02F 3/10          (2023.01)
C02F 3/12          (2023.01)

(56)                    References Cited

U.S. PATENT DOCUMENTS

| | | |
|---|---|---|
| 7,718,057 B2 | 5/2010 | Jordan |
| 8,318,017 B2 | 11/2012 | Fane |
| 8,518,256 B2 | 8/2013 | Cox |
| 8,696,913 B2 | 4/2014 | Casey |
| 8,906,685 B2 | 12/2014 | Takayama |
| 9,902,634 B2 | 2/2018 | Friese |
| 2012/0152814 A1 | 6/2012 | Lean |
| 2015/0336827 A1* | 11/2015 | Boltz ..................... C02F 1/385 |
| | | 210/601 |
| 2017/0015968 A1 | 1/2017 | Parameswaran |
| 2018/0093908 A1* | 4/2018 | Chidambaran ......... C02F 3/108 |

OTHER PUBLICATIONS

Daigger, G. T., & Boltz, J. P. (2018). "Oxygen Transfer in Moving Bed Biofilm Reactor and Integrated Fixed Film Activated Sludge Processes: Daigger and Boltz." Water Environment Research, 90(7), 615-622.

Guo, Jifeng, Guan, Weisheng , & Xia, Siqing, (2014) "Membrane fouling of hybrid submerged membrane bioreactor (hMBR) in treating municipal wastewater." Desalination and Water Treatment, 52:37-39, 6858-6867, DOI: 10.1080/19443994.2013.831778.

Jin, Le, Ong, SayLeong, "HowYongNg, "Fouling control mechanism by suspended biofilm carriers addition in submerged ceramic membrane bioreactors. Journal of Membrane Science 427(2013)250-258.

Leiknes, T., Hallvard Odegaard, "The development of a biofilm membrane bioreactor." Desalination 202 (2006) 135-143.

McQuarrie, J. P., & Boltz, J. P. (2011). "Moving Bed Biofilm Reactor Technology: Process Applications, Design, and Performance." Water Environment Research, 83(6), 560-575. https://doi.org/10.2175/106143010x12851009156286.

Milnes, M. "The Mathematics of Pumping Water AECOM Design Build Civil." Mechanical Engineering. The Royal Academy of Engineering. Retrieved from http://www. raeng. org. uk/publications/other/17-pumping-water.

Shin, C., Kim, K., McCarty, P.L., Kim, J., Bae, J. (2014). "Integrity of hollow-fiber membranes in a pilot-scale anaerobic fluidized membrane bioreactor (AFMBR) after two-years of operation." Separation and Purification Technology. 162: 101-105.

Smith, A.L., Stadler, L.B., Cao, L., Love, N.G., Raskin, L. Skerlos, S.J. (2014). "Navigating wastewater energy recovery strategies: A life cycle comparison of anaerobic membrane bioreactor and conventional treatment systems with anaerobic digestion." Environmental Science and Technology. 48. 5972-5981.

Zheng Y. et al., "Membrane fouling mechanism of biofilm-membrane bioreactor (BF-MBR): Pore blocking model and membrane cleaning." Bioresource Technology 250 (2018) 398-405.

\* cited by examiner

WASTEWATER TREATMENT SYSTEMS AND METHODS

RELATED APPLICATIONS

This application claims the benefit of and priority to U.S. provisional patent application 63/121,363, filed Dec. 4, 2020, the entirety of the disclosure of which is hereby incorporated by this reference thereto.

FIELD OF THE INVENTION

The invention relates to systems and methods for wastewater treatment by a system that incorporates suspended biomass, submerged biofilms and substratum, and membrane plates for solids and water separations.

BACKGROUND OF THE INVENTION

Wastewater may be contaminated by organic and inorganic pollutants. The pollutants may be soluble or particulate. Biological processes may be used for wastewater treatment. Biological wastewater treatment processes utilize microorganisms, such as bacteria and archaea, to metabolically transform pollutants into usable products. Commonly, biological wastewater treatment processes accumulate microorganisms and separate solids from treated water.

Conventional means of biological wastewater treatment are technically insufficient and unsustainable. Current technologies are too large, consume too much energy, produce too many greenhouse gases, and do not capture valuable resources present in the wastewater (e.g., water, energy, nutrients). Thus, the goals for improvement are creating a smaller system, minimizing the consumption of energy and production of greenhouse gases, and capturing valuable resources.

SUMMARY OF THE INVENTION

The disclosure relates to a biofilm membrane reactor (BfMBR) system. The BfMBR system comprises a bioreactor having at least one inlet and at least one outlet; at least two membrane plates positioned within the bioreactor and configured to filter the wastewater to generate permeate, wherein each of the at least two membrane plates is separated from adjacent membrane plates by a membrane gap; a plurality of biofilm carriers suspended within the bioreactor surrounding the at least two membrane plates, wherein a width of the membrane gap is at least two times larger than a smallest dimension of a biofilm carrier of the plurality of biofilm carriers. The membrane plates may have an outside-in flow configuration. The membrane plates may be ceramic. In some aspects, the biofilm carrier comprises a substratum that accumulates microorganisms as biological films or biofilms.

In some aspects, the biofilm carriers are made of plastic.

In a particular embodiment, the bioreactor is an anaerobic bioreactor. The bioreactor may further comprise an apparatus for mixing contents in the bioreactor. In some embodiments, the BfMBR further comprises a hollow-fiber membrane contactor, wherein the hollow-fiber membrane contactor comprises a gas-permeable membrane. In such embodiments, the permeate is passed through the hollow-fiber membrane contactor to extract gases from it.

The disclosure also relates to methods of treating wastewater using the BfMBR. The method may comprise providing wastewater to a bioreactor via an influent wastewater stream, wherein the bioreactor comprises at least two membrane plates positioned within the bioreactor and wherein each of the at least two membrane plates is separated from adjacent membrane plates of the at least two membrane plates by a membrane gap; suspending a plurality of biofilm carriers in the wastewater surrounding the at least two membrane plates, wherein each of the biofilm carriers comprises biofilm capable of biologically transforming contaminants in the wastewater and wherein a width of the membrane gap is at least two times larger than a smallest dimension of a biofilm carrier of the plurality of biofilm carriers; and passing contents of the bioreactor through the at least two membrane plates to generate permeate.

DETAILED DESCRIPTION OF THE INVENTION

Figure 1:
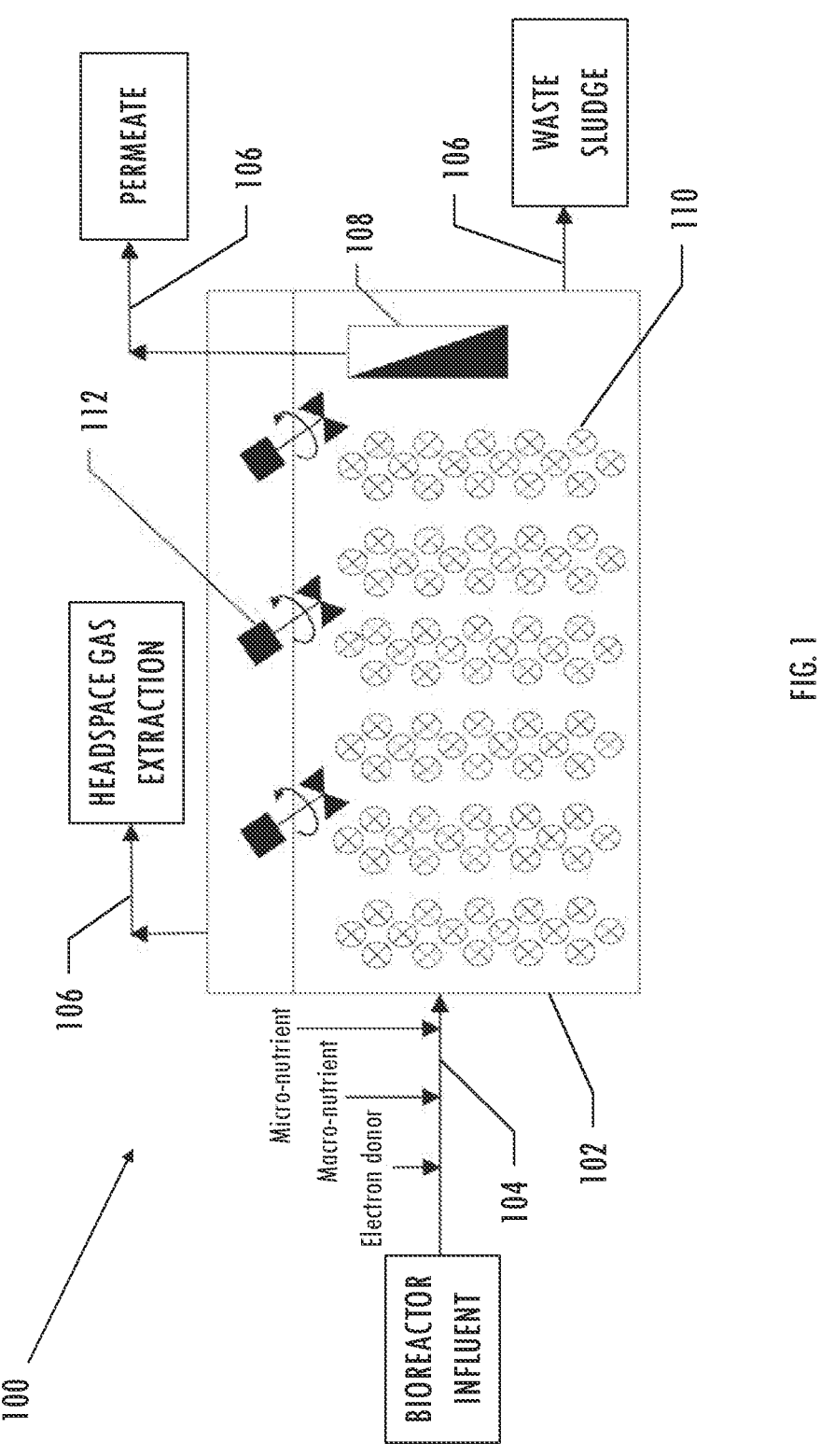
FIG. 1 depicts, in accordance with certain embodiments, a schematic of the BfMBR system with integrated membranes. The BfMBR further comprises biofilm carriers, suspended biomass, and an apparatus for mixing bioreactor contents.

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth to provide a thorough understanding of the various aspects of the invention. It will be understood, however, by those skilled in the relevant arts, that the present invention may be practiced without these specific details. It should be noted that there are many different and alternative configurations, devices and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

As used herein, the term "suspended biomass" describes any accumulation of biological aggregates (e.g., anaerobic granules, aerobic granules, and biological flocs). Suspended biomass does not require a substratum to grow on. Their suspension in a liquid, such as water, is mixing dependent, which may be mechanical, hydraulic, or pumped. Other mixing systems may also be implemented.

As used herein, the term "biofilm" refers to an accumulation of microorganisms (in a relatively dense layer) on a substratum. The biofilm carrier may be any surface that allows biofilm growth and scours membrane plate surfaces. The biofilm substratum may include particles such as sand, non-biodegradable bacterial materials, and synthetic surfaces formed from, for example, polystyrene or high-density polyethylene. Biofilms and biofilm carriers are not fixed and may move freely throughout water when mixed. In some embodiments, biofilm carriers are restrained in a single tank, or portion thereof. In other embodiments, biofilm carriers can migrate throughout a wastewater treatment process.

As used herein, the term "liquid-solid separation" refers to any device employed to substantially separate particles (i.e., undissolved, or suspended, solids) from a liquid such as water. Such devices include membranes (ceramic or polymeric).

As used herein, the term "sludge" refers to compacted organic and inorganic particulate matter suspended in a bioreactor effluent or separated therefrom using liquid-solid separation. The particulate matter may contain suspended biomass, detached biofilm fragments, inorganic particles, other particulates, or any combination thereof. Typically, sludge is compacted by separation processes carried out through liquid-solid separation where the suspended biomass, and other particulate matter, is separated from the bioreactor effluent. In some embodiments, a portion of the sludge and water is returned to the bioreactor—via internal recirculation—for even distribution of the suspended biomass and/or the return of partially treated water to a zone for further treatment. To maintain a desired suspended biomass in a biological wastewater treatment process, a portion of the sludge is disposed of, or wasted, at a rate that is equivalent to the target bacteria rate of growth, or yield. The disposed sludge may be subjected to further treatment(s) such a thickening, digestion, dewatering, and/or other technologies that are collectively referred to as solids management. The wasted portion of sludge is referred to as "waste sludge".

The term "internal recirculation" refers to the extraction of sludge (including suspended biomass, detached biofilm, and other particulate material) and water from a specific position (or specific zone) in a bioreactor and its conveyance to another position in the bioreactor, or specific zone in a partitioned bioreactor.

As used herein, the term "bioreactor influent" refers to water flowing into a bioreactor having one or more contaminants (a.k.a. pollutants) present therein. Sources of bioreactor influent include, but are not limited to, industrial wastewaters, food-processing wastewaters, municipal wastewaters, irrigated agricultural wastewaters, reclaimed water, potable water, and storm water.

As used herein, the term "bioreactor effluent" refers to water flowing from a bioreactor that has not had particulate matter removed by liquid-solid separation. Water constituting the bioreactor effluent has had all or a portion of contaminants in the bioreactor influent oxidized or reduced by bacterially induced transformation processes resulting from a specific set of environmental conditions in the bioreactor (e.g., solids-residence time, biofilm area, wastewater temperature, pH, electron-donor concentration, electron-acceptor concentration, suspended solids concentration, and redox condition). Microorganisms may exist as suspended biomass, biofilms, or a combination of suspended biomass and biofilms.

As used herein, the term "mechanical mixing" refers to means of agitating water (particularly in a bioreactor), for example, to evenly distribute contaminants, suspended biomass, and biofilm carriers throughout a bioreactor.

As used herein, the term "permeate" refers to treated wastewater that has passed through a membrane plate filter (e.g., microfiltration or ultrafiltration membranes) so that a substantial portion of solids have been removed therefrom. The permeate is a membrane effluent.

As used herein, the term "gas introduction" refers to the inflow of gas by, but not limited to, diffusers to promote a specific environmental condition (e.g., aerobic), and/or agitate water, for example, to evenly distribute its contaminants, suspended biomass, and biofilm carriers throughout a bioreactor, and/or to control membrane plate biofouling. In some embodiments, the source of gas introduced to the system is external (e.g., compressed air to supply $O_2$). In other embodiments, the source of gas introduced to the system may originate from the system itself (e.g., captured and recirculated headspace gas). For example, biogas (methane and carbon dioxide) produced in an anaerobic bioreactor may be subject to gas extraction and recirculation.

As used herein, the term "gas extraction" refers to the collection and removal of gas (e.g., from an enclosed BfMBR) by, but not limited to, vacuum for collection, further treatment, reuse, or any combination thereof.

As used herein, the term "aerobic" means living, active, or occurring only in the presence of oxygen.

As used herein, the term "anaerobic" means living, active, or occurring only in the substantial absence of oxygen.

As used herein, the term "partition" or "partitioned" relates to bioreactors and indicates a bioreactor that is separated into two or more zones. A zone is defined as a volume within a bioreactor having the same, or different, conditions than another zone; it is a volume within the bioreactor that is physically separated from another zone. The separation of zones may exist because of, but is not limited to physical features (e.g., screens and/or walls) or location in the process. The conditions may be selected from environmental conditions such as aerobic and anaerobic but can comprise other factors that affect microbial metabolism (e.g., electron-donor and -acceptor availability).

As used herein, the term "hollow fiber membrane contactor" or "HFMC" refers to a gas-permeable membrane that has a sweep gas or solution flowing through its lumen to extract gaseous constituents from the permeate. The HFMC may be a single vessel or a plurality of vessels (for example, arranged in parallel or in series) where each vessel contains gas-permeable membranes. Contaminated water is fed to the vessel, or the plurality of vessels and gas fills the membranes pores. The driving force created by the extracting gas or solution strips a target dissolved gaseous compound, or compounds, from the permeate. The stripped gas may react with the solution to form a recoverable product. For example, ammonia-nitrogen that has been stripped from the bulk of the liquid may react with a sulfuric acid solution to form the fertilizer ammonium sulfate. As another example, methane dissolved in permeate may be stripped from the bulk of the liquid using a flowing nitrogen gas.

As used herein, the term "stripped" refers to a change from a dissolved state to a gaseous form.

As used herein, the term "hollow fiber membrane contactor effluent" means water flowing from a HFMC that has had all or a portion of contaminants in the permeate stripped by physical-chemical processes resulting from a specific set of environmental conditions in the HFMC (e.g., temperature, pH, and contaminant concentration, sweep solution or gas composition and concentrations).

As used herein, the term "dimension" refers to a measurement of length, width, height, or any other distance measurement relating to the physical size of an object, where the measurement is taken between the two most extreme points of the object along one axis.

As used herein, the term "permeate flux" refers to the volumetric flow rate of fluid being filtered per unit area of membrane (e.g., m3/d·m2).

As used herein, the term "gas sparging" refers to the process in which gas is bubbled through the wastewater for membrane-biofouling control.

As used herein, the term "membrane gap" refers to a space between the surfaces of adjacent membrane plates through which biofilm carriers and wastewater can flow.

Disclosed herein is a BfMBR system 100 that utilizes biological and physical systems for treating contaminated water. The BfMBR 100 comprises either an anaerobic, an aerobic, or a combination bioreactor that removes contaminants from water. The BfMBR may have any combination of electron donors and electron acceptors. In a particular embodiment, the BfMBR 100 comprises an anaerobic bioreactor. The BfMBR 100 comprises a bioreactor 102 with at least one inlet 104 and at least one outlet 106 for wastewater to pass through the bioreactor 102, at least two membrane plates 108 positioned within the bioreactor 102, and a plurality of biofilm carriers 110 suspended within the bioreactor 102. The system 100 may also comprise a mixer 112 and/or a hollow-fiber membrane contactor (HFMC) 114. The BfMBR 100 may have influent and effluent water, influent and effluent gas, and/or influent and effluent solids. The at least one inlet 104 of the bioreactor 102 is configured to pass wastewater into the bioreactor 102. The at least one outlet 106 may comprise any one or combination of the following: a gas outlet configured to collect gas out of the bioreactor 102; a waste outlet configured to pass waste out of the bioreactor 102; and a permeate outlet configured to pass permeate out of the bioreactor 102.

Biofilm and its substratum are submerged in the wastewater within the bioreactor 102. The biofilm carriers 110 are also suspended in the wastewater and provide a surface upon which biofilms accumulate. In some aspects, the biofilm carriers 110 serve as the biofilm substratum. In other aspects, the biofilm carriers scour the membrane plates 108 to reduce membrane biofouling. The BfMBR 100 accumulates suspended biomass by selectively wasting sludge, incorporating biofilm carriers 110, or by selectively wasting sludge and incorporating biofilm carriers 110. Accordingly, in some aspects, the BfMBR 100 comprises suspended biomass. The membrane plates 108 provide physical liquid-solid separation by substantially separating biomass and other solids from treated water, or permeate. In some embodiments, the permeate flux through each of the membrane plates 108 is at least 0.25 cubic meters per day per square meter.

Figure 5:
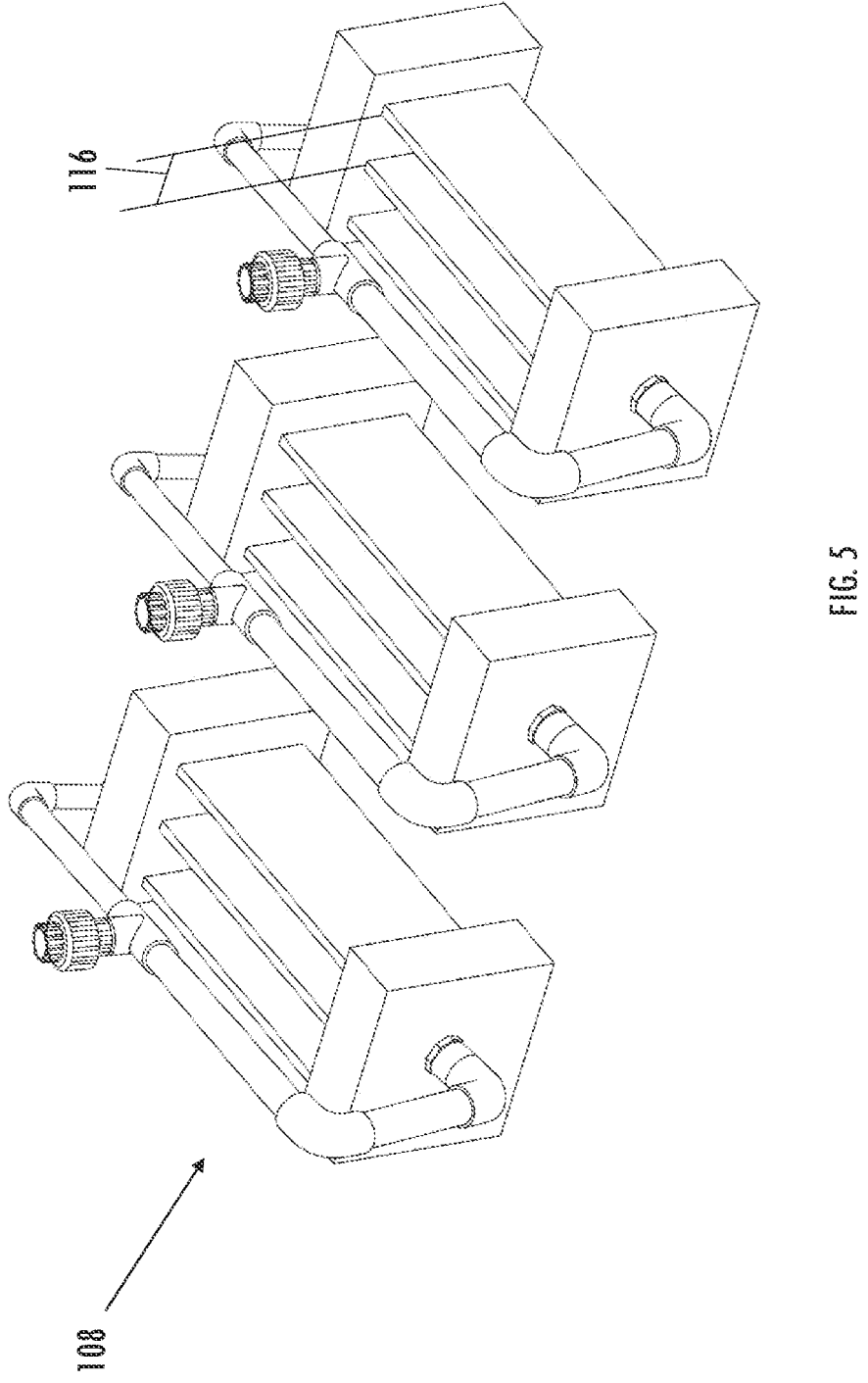
FIG. 5 depicts, in accordance with certain embodiments, the membrane plates with a membrane gap between each of the membrane plates.

In certain embodiments, the membrane plates 108 are microfilters (for example, a pore size of 0.2 to 0.4 μm) or ultrafilters (for example, a pore size of 0.01 to 0.02 μm). The membrane plates 108 may be formed of a ceramic material, a polymeric material, or any other durable and compatible material as known in the art. In particular embodiments, the membrane plate 108 is a ceramic membrane made with, for example, alumina, titania, silicon-carbide, or silica-based ceramic membranes. In particular embodiments, the membrane plates 108 are positioned within the bioreactor 102 (FIG. 1). For example, the membrane plates 108 may be plates that are submerged inside the bioreactor 102. The membrane plates 108 are configured to filter the wastewater. Each of the membrane plates 108 may be separated from adjacent membrane plates 108 by a membrane gap 116, as shown in FIG. 5. In some implementations, the membrane gap 116 may have a width that is at least two times larger than a smallest dimension of one of the biofilm carriers 110. This membrane gap 116 provides space for the biofilm carriers 110 to move freely between each of the membrane plates 108 and promote biofilm carriers frequently contacting membrane plate surfaces. In some implementations, the width of the membrane gap 116 may be at least 5 mm, 10 mm, 20 mm, 25 mm, or between 30 mm and 60 mm. These membrane gap sizes are significantly larger than is typical.

The plurality of biofilm carriers 110 frequently contact exposed membrane plate surfaces. These collisions may result in scouring off solids that have accumulated on the membrane plate surfaces. The membrane plates 108 prevent biomass and other solids (that are larger than the membrane plate orifices) from exiting the bioreactor with permeate. Accordingly, the membrane plates 108 have an outside-in flow configuration. Biomass and other particles that are larger than the membrane plate orifices are retained by the membrane plates 108 inside the bioreactor 102 until they are eventually removed from the bioreactor 102 as waste sludge.

The biofilm carriers 110 may be made of sand, non-biodegradable organic materials, or synthetic surfaces formed from, for example, ceramic, polystyrene, high-density polyethylene, or polymeric materials. In certain embodiments, the biofilm carriers are formed of a plastic material. The biofilm carriers are not fixed. Instead, mechanical mixing of the fluid in the BfMBR 100 results in the distribution of biofilm carriers in the BfMBR 100. Where the membrane plates 108 are positioned within the bioreactor 102, the biofilm carriers 110 in the bioreactor 102 scour the membrane plate surfaces, which provides the benefit of reducing membrane fouling, performance deterioration (e.g., excessive loss of transmembrane pressure), and maintenance (e.g., backwashing and chemical cleaning). In some aspects, the biofilm carriers 110 comprise a substratum and an open and substantially flat disk. In some aspects, the biofilm carriers 110 are formed as a hyperbolic paraboloid. Any other material and shape may also be used for the biofilm carriers 110, with important characteristics including durability and specific surface area. In some embodiments, the specific surface area of the biofilm carriers 110 is at least 500 m²/m³. The plurality of biofilm carriers 110 may fill a substantial amount of the bioreactor 102. For example, a ratio between a total volume of the plurality of biofilm carriers 110 and a volume of the bioreactor 102 may be at least 0.1. In other embodiments, the ratio may be at least 0.3 or at least 0.4. In other embodiments, the ratio may be less than 0.6.

The mixer 112 is configured to agitate the wastewater within the bioreactor 102. The mixer 112 may be a mechanical mixer, a pump, and/or gas introduction, and may be positioned within the bioreactor 102 for optimal mixing.

In some embodiments, the BfMBR 100 further comprises a means for gas extraction, for example, at the bioreactor head space.

The BfMBR 100 utilizes microorganisms suspended in the water and microorganisms in biofilms that grow on biofilm carriers (i.e., biofilm). In some embodiments, the BfMBR 100 has a reaction volume that may include the suspended microorganisms, biofilms, biofilm carriers, a mechanical mixing device, methods to introduce a gas or to extract a gas, and a membrane separator.

In some embodiments, the permeate from the BfMBR 100 is further treated, for example, with a HFMC 114. The HFMC 114 comprises a gas-permeable membrane 118. Thus, when permeate is passed through the HFMC 114, the HFMC 114 removes a dissolved gas, or gases, from the permeate. As a result, further processing with the HFMC 114 may enable product recovery, such as recovery of methane or ammonia. In such embodiments, the influent wastewater to the bioreactor or the bioreactor effluent or the permeate from the BfMBR 100 comprises at least one dissolved gas. In some embodiments, gas may be introduced to the treatment process. In other implementations, the gas may be produced within the treatment process.

Figure 6:
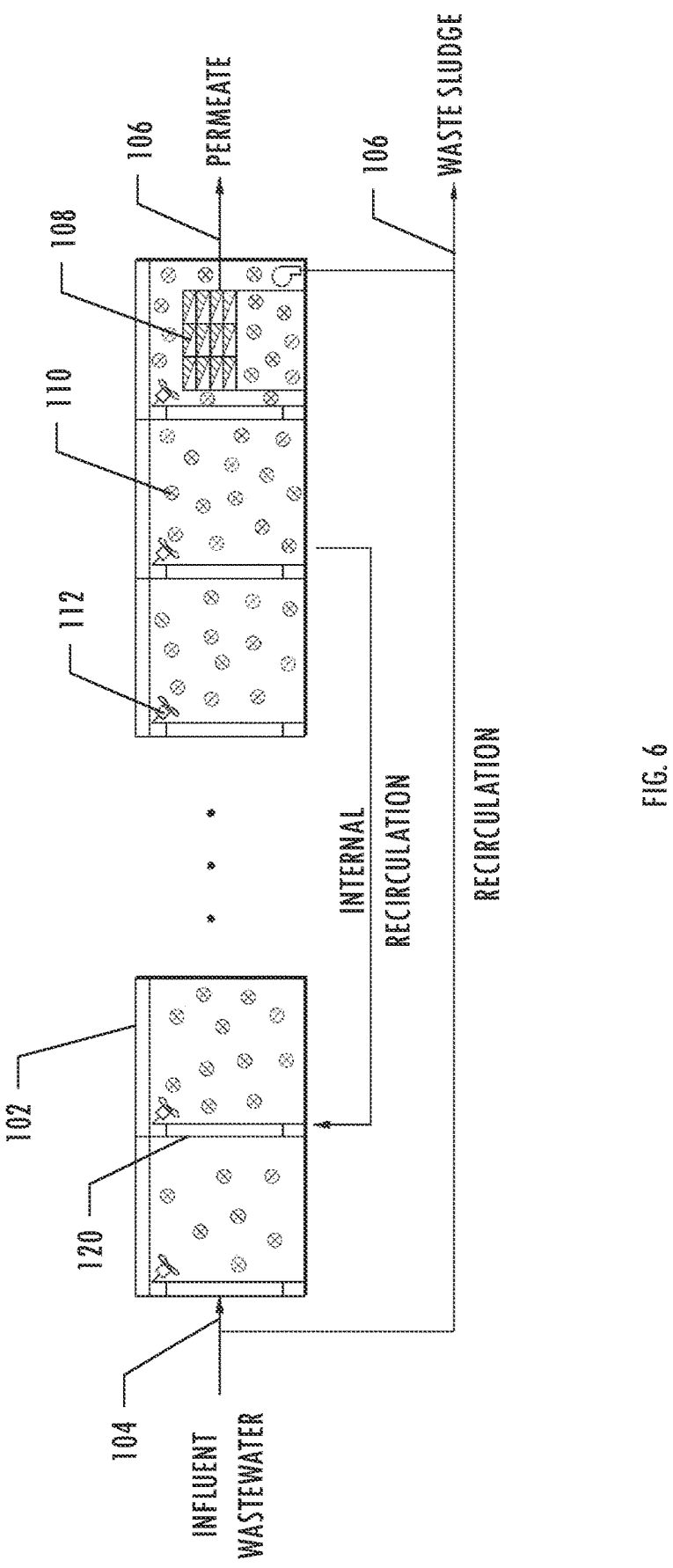
FIG. 6 depicts, in accordance with certain embodiments, a schematic of the BfMBR system showing that a series of bioreactors may be implemented.
Figure 7:
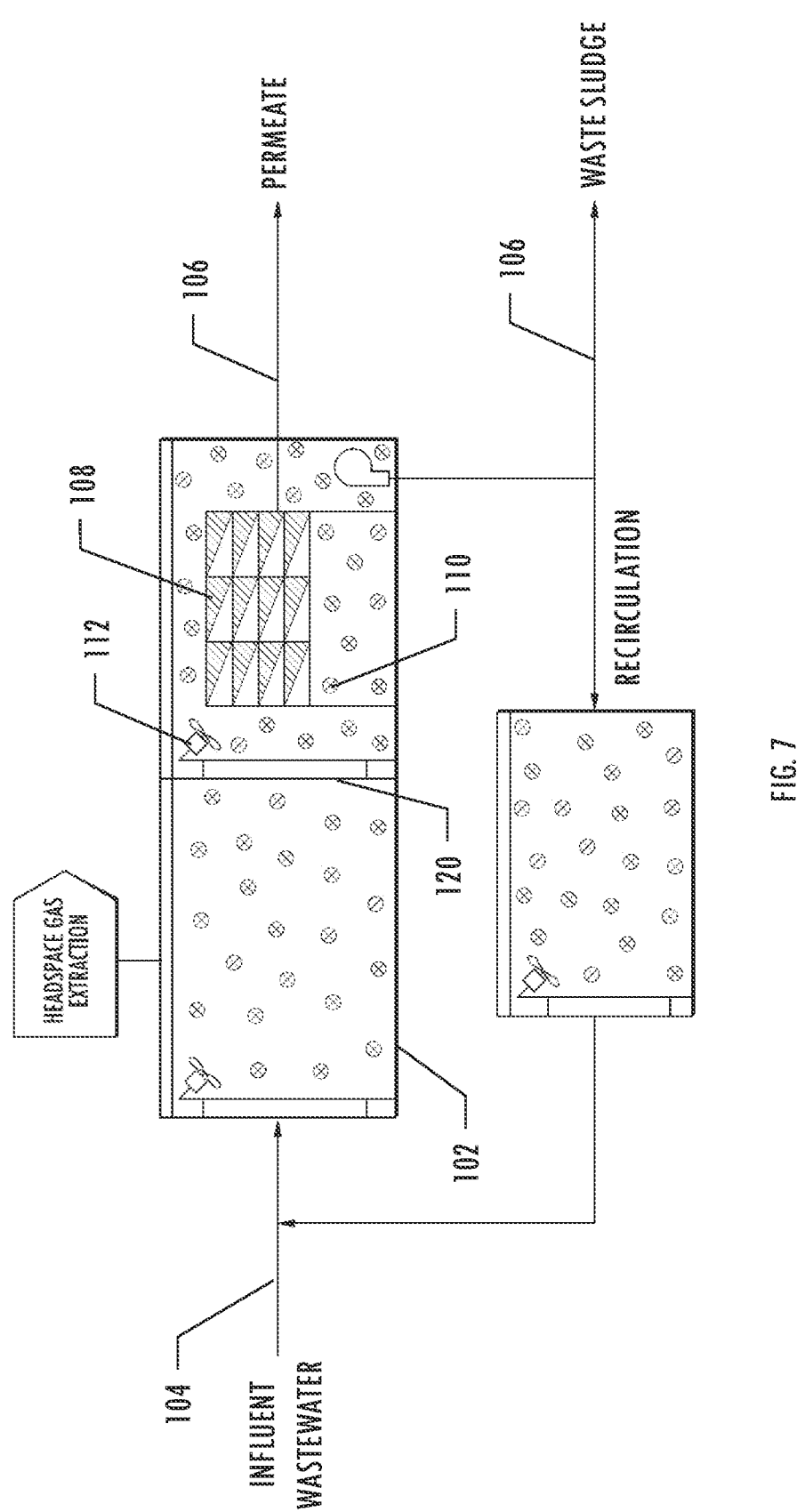
FIG. 7 depicts, in accordance with certain embodiments, a schematic of the BfMBR system with a side treatment as part of the recirculation system.

In a particular embodiment, the BfMBR 100 comprises an inlet 104 adapted to receive influent wastewater; a bioreactor 102 comprising biofilm carriers; membrane plates 108; and an outlet 106 adapted to dispense bioreactor effluent. The BfMBR 100 may be adapted to receive one or more supplemental liquid or gas in flows. The BfMBR 100 may include any number of zones, as shown in FIG. 6. The BfMBR 100 may be adapted to disperse or receive internal recirculation streams. In some embodiments the supplemental in-flows may include macro-nutrients (e.g., C, N, P), micro-nutrients (e.g., Se), an electron donor (e.g., acetic acid, methanol, or $H_2$ gas), and/or gas (e.g., $O_2$ or air). In some embodiments, the BfMBR may be adapted for the capture and extraction of headspace gas (e.g., methane).

In a particular embodiment, the BfMBR 100 comprises submerged biofilm and biofilm carriers that support biofilm growth, for example the BfMBR 100 comprises a biofilm carrier 110. In some embodiments, the biofilm carrier 110 scours the membrane plate surfaces, which reduces membrane fouling, minimizes performance deterioration, and maintenance. Embodiments that promote an anaerobic bioreactor and include biofilms and biofilm carriers may be called an anaerobic biofilm membrane bioreactor (AnBfMBR). In some embodiments, membrane plates 108 have an outside-in flow of water and may be integrated with the bioreactor 102 (FIG. 1).

Figure 2:
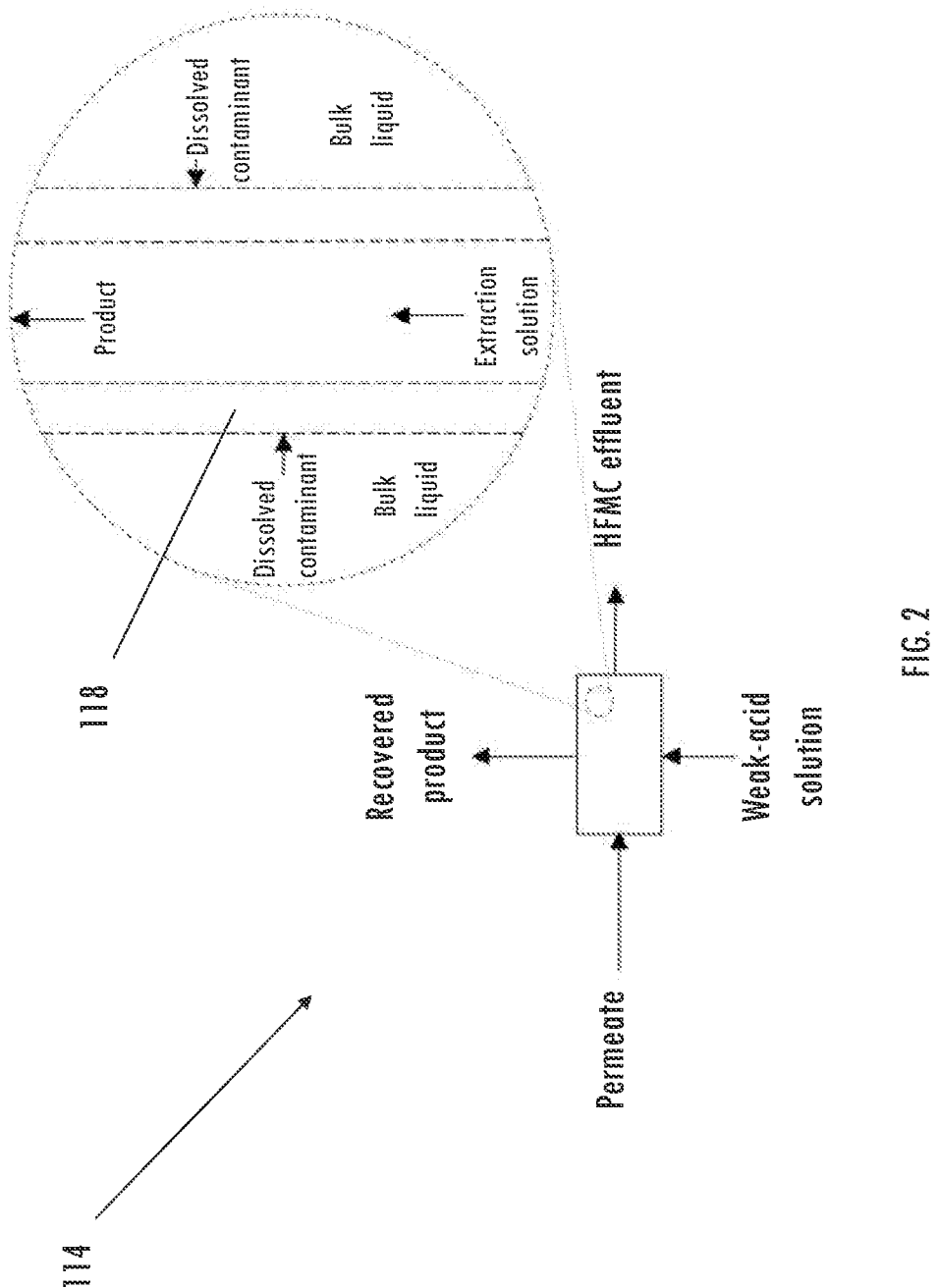
FIG. 2 depicts, in accordance with certain embodiments, a hollow-fiber membrane contactor (HFMC) schematic for dissolved gas and product recovery.
Figure 3:
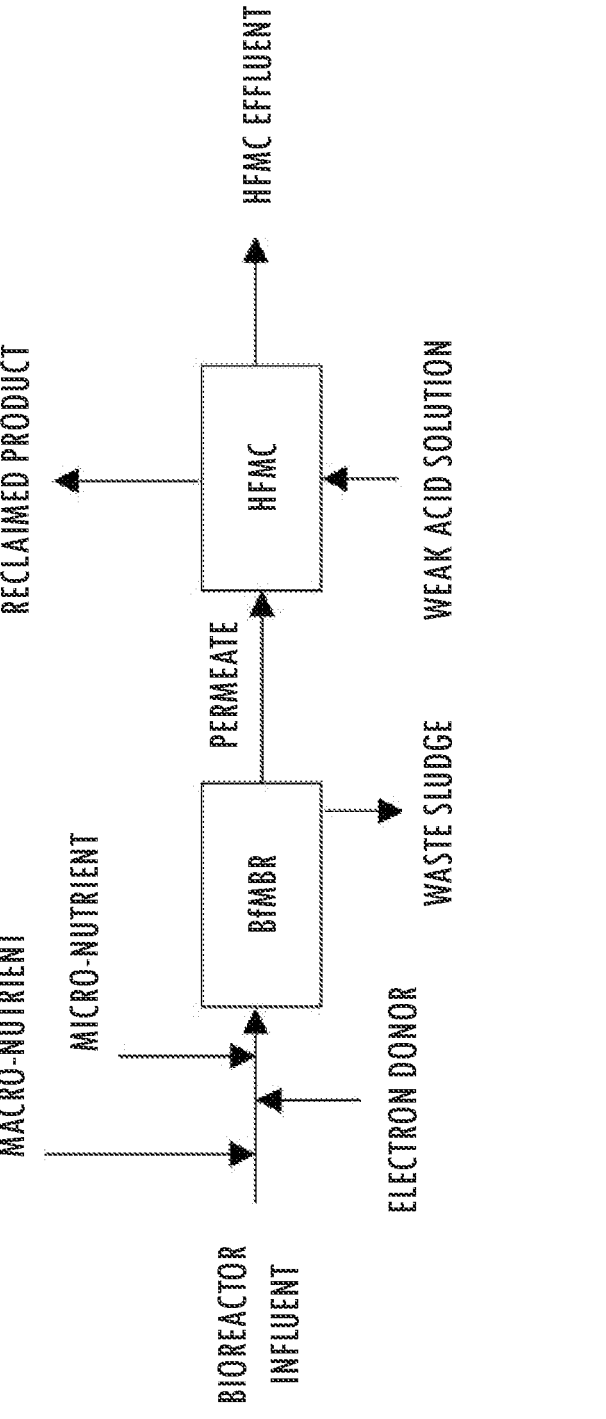
FIG. 3 depicts, in accordance with certain embodiments, a schematic of a BfMBR system in fluid communication with a HFMC.

In some embodiments, the BfMBR system 100 further comprises a HFMC 114 that is adapted to receive permeate. In some embodiments, the HFMC 114 is adapted to receive, through the membrane lumen, a solution that promotes the extraction of dissolved gases from the permeate (for example, sulfuric acid, $H_2SO_4$); it creates a driving force (e.g., pH or concentration differentials) for the selective extraction of dissolved gases across a gas-permeable membrane (FIG. 2). In some embodiments, a HFMC inlet is in fluid communication with the BfMBR outlet and receives permeate (FIG. 3). The HFMC inlet is adapted to receive permeate having one or more dissolved gaseous contaminants (e.g., methane and ammonia) and an outlet that has been adapted to dispense effluent. In some embodiments, the HFMC has an outlet that has been adapted to dispense gaseous contaminants, a sweep gas or solution, or products that have accumulated inside the membrane lumen.

Figure 4:
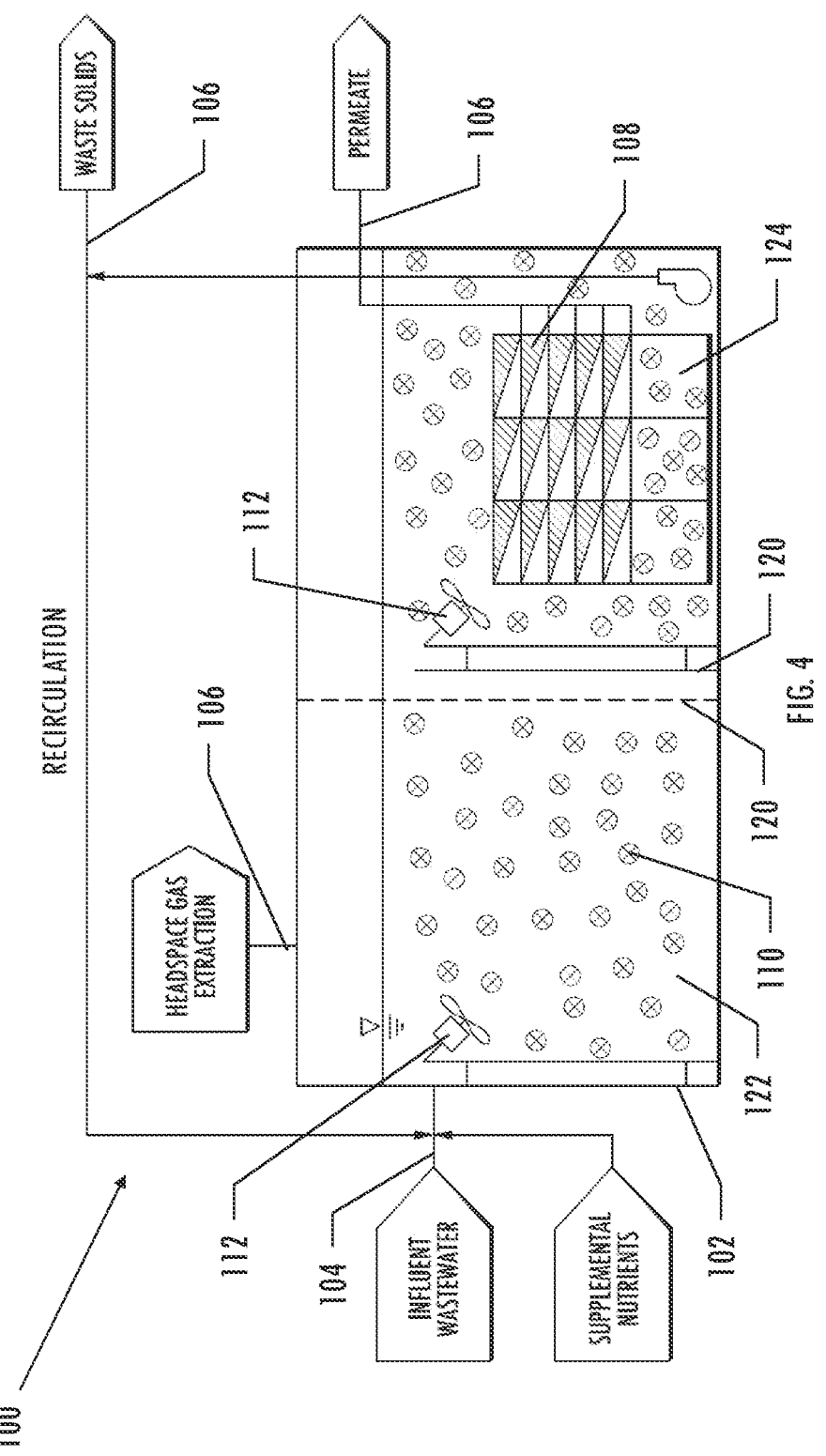
FIG. 4 depicts, in accordance with certain embodiments, a schematic of the BfMBR system with a wall partitioning the bioreactor into zones.

In some embodiments, the bioreactor 102 is partitioned by a wall 120 into a first zone 122 and a second zone 124, as shown in FIG. 4. Each of the membrane plates 108 may be located within the second zone 124 of the bioreactor 102. The wall 120 may be a screen or may be a solid material. As mentioned above, in some bioreactor zones, the bioreactor zone is cyclically alternated between two or more different environmental conditions. In some embodiments, zones are physically separated, for example, by one or more partitions 120. Partitions 120 include walls, submerged weir walls, screen walls, curtains, or other physical separation devices.

In some embodiments, one or more partitions 120 are positioned parallel to the direction of flowing contaminated water in a bioreactor 102 thereby creating parallel bioreactors 102. In other embodiments, one or more partitions 120 are positioned perpendicular to the direction of flowing contaminated water in a bioreactor 102 thereby creating bioreactors in series, as shown in FIG. 4. In some embodiments, zones are separated solely by flow, for example, by not adding gas (e.g., air) in an upstream portion of a bioreactor 102 while adding gas in a downstream portion of the bioreactor 102. The fluid flow pattern within the bioreactor 102 may result in the creation of zones. Any of these partitioned embodiments are encompassed when referring to a partitioned bioreactor unless specified otherwise. Any bioreactor 102 described herein can be a partitioned bioreactor whether or not it has been specified as such in a particular embodiment. A representative example of specific partitioning does not limit the embodiment as to other partitioning schemes, unless specified otherwise. In some aspects, additional different environmental zones can exist in a series of zones.

The disclosure is also related to a method of treating and removing contaminants from wastewater using the BfMBR 100. The method may comprise providing wastewater to a bioreactor 102 via an influent wastewater stream, wherein the bioreactor 102 comprises at least two membrane plates 108 positioned within the bioreactor 102 and wherein each of the at least two membrane plates 108 is separated from adjacent membrane plates 108 of the at least two membrane plates 108 by a membrane gap 116; suspending a plurality of biofilm carriers 110 in the wastewater surrounding the at least two membrane plates 108, wherein each of the biofilm carriers 110 comprises biofilm capable of biologically removing contaminants from the wastewater and wherein a width of the membrane gap 116 is at least two times larger than a smallest dimension of a biofilm carrier 110 of the plurality of biofilm carriers 110; and passing contents of the bioreactor 102 through the at least two membrane plates 108 to generate permeate. Passing the contents of the bioreactor 102 through the at least two membrane plates 108 may occur with a permeate flux that is greater than 0.1 $m^3/d·m^2$, and in some cases is at least 0.25 $m^3/d·m^2$. In some aspects, the wastewater comprises one or more dissolved gasses. The method may further comprise passing the permeate through a HFMC 114, wherein the gas, or gases, are removed with an extraction solution. The extraction solution may be a weak acid. The method may also further comprise conducting gas sparging under the at least two membrane plates 108, may further comprise mixing the wastewater and the plurality of biofilm carriers 110 within the bioreactor 102, and may further comprise scouring the at least two membrane plates 108 with the plurality of biofilm carriers 110.

In some implementations, the method further comprises adding supplemental nutrients such as at least one macro-nutrient, at least one micronutrient, and at least one electron donor and/or electron acceptor to the wastewater. In other aspects, the wastewater comprises at least one macronutrient, at least one micronutrient, at least one electron donor, and/or electron acceptor. As such, the influent wastewater stream does not need to be added with at least one macro-nutrient, at least one micronutrient, and/or at least one electron donor.

What is claimed is:

1. A biofilm membrane bioreactor system comprising:
   a bioreactor having at least one inlet and at least one outlet;

at least two membrane plates positioned within the biore-actor and configured to filter wastewater to generate permeate, wherein each of the at least two membrane plates is separated from adjacent membrane plates of the at least two membrane plates by a membrane gap;

a plurality of biofilm carriers suspended within the biore-actor surrounding the at least two membrane plates, wherein a width of the membrane gap is at least two times larger than a smallest dimension of a biofilm carrier of the plurality of biofilm carriers; and a hollow-fiber membrane contactor having a gas-perme-able membrane, wherein the hollow-fiber membrane contactor is configured to remove at least one dissolved gas from the permeate into an extraction solution.

2. The biofilm membrane bioreactor system of claim 1, wherein:

the at least one inlet is configured to pass the wastewater into the bioreactor;

the at least one outlet comprises a gas outlet configured to collect gas out of the bioreactor;

the at least one outlet comprises a waste outlet configured to pass waste out of the bioreactor; and/or the at least one outlet comprises a permeate outlet con-figured to pass permeate out of the bioreactor.

3. The biofilm membrane bioreactor system of claim 1, further comprising a mixer configured to agitate the waste-water within the bioreactor.

4. The biofilm membrane bioreactor system of claim 1, wherein each of the at least two membrane plates is formed of a ceramic material.

5. The biofilm membrane bioreactor system of claim 1, wherein the bioreactor is partitioned by a wall into a first zone and a second zone, wherein each of the at least two membrane plates is located within the second zone of the bioreactor.

6. The biofilm membrane bioreactor system of claim 1, wherein the width of the membrane gap is at least 5 mm.

7. The biofilm membrane bioreactor system of claim 1, wherein a ratio between a total volume of the plurality of biofilm carriers and a volume of the bioreactor is at least 0.1.

8. The biofilm membrane bioreactor system of claim 1, wherein the plurality of biofilm carriers is configured to scour the at least two membrane plates.

9. The biofilm membrane bioreactor system of claim 1, wherein the biofilm carrier is made of plastic.

10. The biofilm membrane bioreactor system of claim 1, wherein the biofilm carrier comprises a substratum that accumulates microorganisms.

11. A method of treating wastewater comprising:

providing wastewater to a bioreactor via an influent wastewater stream, wherein the bioreactor comprises at least two membrane plates positioned within the biore-actor and wherein each of the at least two membrane plates is separated from adjacent membrane plates of the at least two membrane plates by a membrane gap;

suspending a plurality of biofilm carriers in the wastewa-ter surrounding the at least two membrane plates, wherein each of the biofilm carriers comprises biofilm capable of biologically removing contaminants from the wastewater and wherein a width of the membrane gap is at least two times larger than a smallest dimen-sion of a biofilm carrier of the plurality of biofilm carriers;

passing contents of the bioreactor through the at least two membrane plates to generate permeate comprising one or more dissolved gases; and passing the permeate through a hollow-fiber membrane contactor, whereby the gas, or gases, are removed into an extraction solution.

12. The method of claim 11, further comprising conduct-ing gas sparging under the at least two membrane plates.

13. The method of claim 11, further comprising mixing the wastewater and the plurality of biofilm carriers within the bioreactor.

14. The method of claim 11, wherein the width of the membrane gap is at least 5 mm.

15. The method of claim 11, further comprising scouring the at least two membrane plates with the plurality of biofilm carriers.

\* \* \* \* \*